United States Patent [19]

Hiroshi et al.

[11] Patent Number: 4,545,756
[45] Date of Patent: Oct. 8, 1985

[54] HYDRAULIC CLAMPING APPARATUS FOR AN INJECTION MOLDING MACHINE

[76] Inventors: Sakurai Hiroshi, 27-4, Minamioi 5-chome, Shinagawa-ku, Tokyo, Japan, 140; Kim Yong Chul, Room 701, No. 2 Bldg., Han-nam Heights Apt., Oksoo-dong, Sung-dong-ku, Seoul, Rep. of Korea

[21] Appl. No.: 632,969

[22] Filed: Jul. 20, 1984

[51] Int. Cl.$^4$ .............................................. B29F 1/00
[52] U.S. Cl. .................................. 425/590; 425/451.2
[58] Field of Search .............................. 425/451.2, 590

[56] References Cited

U.S. PATENT DOCUMENTS

| | | | |
|---|---|---|---|
| 3,263,277 | 8/1966 | Ohlendorf et al. | 425/451.2 |
| 3,270,372 | 9/1966 | Hesse | 425/451.2 |
| 3,656,877 | 4/1972 | Aoki | 425/490 X |
| 3,677,685 | 7/1972 | Aoki | 425/451.2 |
| 4,158,327 | 6/1979 | Aoki | 425/451.2 X |

*Primary Examiner*—J. Howard Flint, Jr.
*Attorney, Agent, or Firm*—John E. Toupal; Harold G. Jarcho

[57] ABSTRACT

A hydraulic clamping apparatus including a base, a first support means for supporting a first mold and retained by the base and a second support means for supporting a second mold and retained by the base means, the second support means being movable relative to the base means along a path so as to move the second mold into engagement with the first mold. A first hydraulic actuator comprises a first cylinder, a first piston retained thereby, and a rod coupled between the first piston and the second support means. The first actuator is operable to produce reciprocating first strokes of the rod along the path. A second hydraulic actuator comprises a second cylinder and a ram piston shaped and arranged so as to permit with respect thereto relative movement along the path of the second support means. The ram piston has a diameter substantially greater than the first piston and is movable along the path in reciprocating second strokes substantially shorter than the first strokes. In addition, the second cylinder comprises large and small diameter portions retaining, respectively, a large diameter portion of the ram piston and a small diameter portion thereof and the ram piston defines an opening that is axially aligned with and receives the rod which is connected to an engagement portion of the second support means. The second actuator further comprises a first annular seal between the large diameter portions of the second cylinder and the ram piston and a second annular seal between the small diameter portions thereof. Finally, a clutch mechanism is operable to engage the ram piston with the engagement portion of the second support means so as to produce movement thereof in response to said second strokes.

22 Claims, 8 Drawing Figures

HYDRAULIC CLAMPING APPARATUS FOR AN INJECTION MOLDING MACHINE

BACKGROUND OF THE INVENTION

This invention relates generally to hydraulic clamping apparatus and, more particularly, to hydraulic clamping apparatus for injection molding machines.

According to typical prior art hydraulic mold clamping systems, a small quick feed cylinder is retained by the ram piston of a large high force cylinder. Thus, during a quick feed stroke of the mold produced by the small cylinder, the large ram piston must also move. This factor undesirably entails the flow of large oils volumes to the large cylinder. In some systems this results in loss of power and often requires costly special buffers in the hydraulic circuits to switch clamping speed and to prevent shocks at stoppage. In other systems, the large oil flow creates air bubbles that cause the apparatus to produce unacceptable finished parts. In addition, the requirement for rapid, lengthly movement of the large ram piston substantially increases both machining and repair costs of the apparatus.

Many of the above disadvantages are obviated by mold clamping systems disclosed by Japanese Utility Model Nos. 46-9264 and 49-44064. Disclosed thereby are mold clamping arrangements in which a small diameter piston reciprocates independently of a large diameter ram piston to provide quick feed movement of a mold. Subsequently, a clutch mechanism engages the ram piston which then provides a short stroke that results in a high closure force on the mold pieces. Although offering some improvement, these systems also suffer deficiencies including the requirement for high pressure seals subject to lengthy quick feed piston strokes, the requirement for replacing clutch mechanisms when mold sizes are changed and problems associated with accurately repeatable clutch mechanism movement.

The object of this invention therefor is to provide an improved hydraulic clamping apparatus for injection molding machines.

SUMMARY OF THE INVENTION

The invention is a hydraulic clamping apparatus including a base, a first support means for supporting a first mold and retained by the base and a second support means for supporting a second mold and retained by the base means, the second support means being movable relative to the base means along a path so as to move the second mold into engagement with the first mold. A first hydraulic actuator comprises a first cylinder, a first piston retained thereby, and a rod coupled between the first piston and the second support means. The first actuator is operable to produce reciprocating first strokes of the rod along the path. A second hydraulic actuator comprises a second cylinder and a ram piston shaped and arranged so as to permit with respect thereto relative movement along the path of the second support means. The ram piston has a diameter substantially greater than the first piston and is movable along the path in reciprocating second strokes substantially shorter than the first strokes. In addition, the second cylinder comprises large and smaller diameter portions retaining, respectively, a large diameter portion of the ram piston and a small diameter portion thereof and the ram piston defines an opening that is axially aligned with and receives the rod which is connected to an engagement portion of the second support means. The second actuator further comprises a first annular seal between the large diameter portions of the second cylinder and the ram piston and a second annular seal between the small diameter portions thereof. Finally, a clutch mechanism is operable to engage the ram piston with the engagement portion of the second support means so as to produce movement thereof in response to said second strokes. This arrangement eliminates any requirement for high pressure seals between the high pressure second cylinder and the rod which undergoes lengthly strokes.

According to one feature, the invention includes an adjustment means for adjusting the spacing along the path between the engagement portion of the second support means and the second mold. This feature facilitates adaptation of the apparatus for use with molds of different size.

According to another feature of the invention the ram piston defines an internal cavity that receives the engagement portion of the second support means after completion of the first stroke in a direction that separates the first and second molds. This feature permits a reduction in the overall length of the clamping apparatus.

According to still another feature of the invention the clutch mechanism is retained by the ram piston. This feature insures proper alignment between the clutch mechanism and the ram piston during the closure strokes thereof.

Another embodiment of the invention includes a base, a first support means for supporting a first mold and retained by the base means and a second support means for supporting a second mold and retained by the base means. The second support means is movable relative to the base along a path so as to move the second mold into engagement with the first mold. A first hydraulic actuator comprises a plurality of first cylinders, a plurality of first pistons each retained by one of the first cylinders, and a plurality of rods each coupled between one of the first pistons and the second support means. The first actuator is operable to produce reciprocating first strokes of the rods along the path. A second hydraulic actuator comprises a second cylinder and a ram piston shaped and arranged so as to permit with respect thereto relative movement along the path of the second support means and the ram piston has a diameter substantially greater than the first piston and is movable along the path in reciprocating second strokes substantially shorter than the first strokes. The axis of the second strokes is paratllel to and transversely displaced from the axes of first strokes. Finally, a clutch mechanism is operable to engage the second piston with an engagement portion of the second support means so as to produce movement thereof in response to the second strokes. This embodiment also eliminates any requirement for high pressure seals between the second cylinder and the rods which undergo strokes a substantial length.

According to a further feature of the invention, the rod is coupled to the second support means by a rotatable coupling. Because of the rotatable coupling, some deviation in concentricity is tolerated between the rod and the second support means.

DESCRIPTION OF THE DRAWINGS

These and other objects and features will become more apparent upon a perusal of the following description taken in conjunction with the accompanying drawings wherein.

DESCRIPTION OF THE PREFERRED EMBODIMENTS

Figure 1:
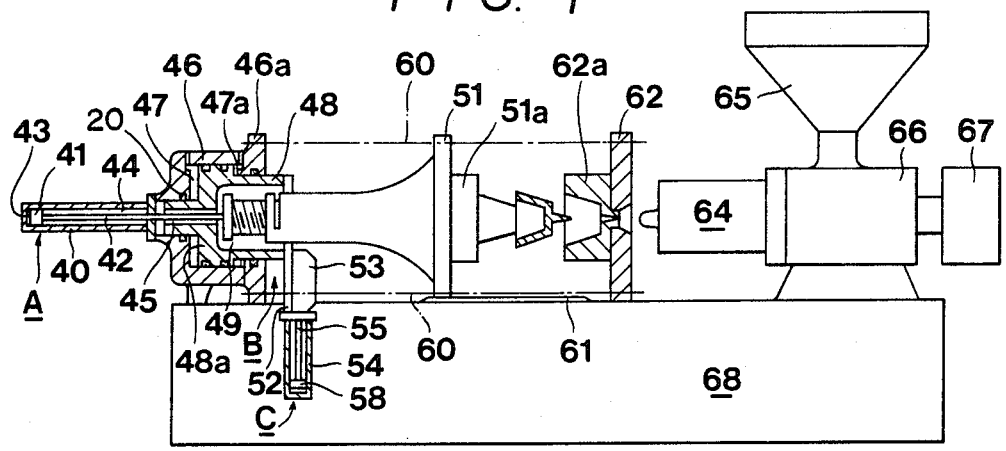
FIG. 1 is a schematic side sectional view of an injection molding machine provided with a hydraulic clamping device in accordance with a first embodiment of the present invention.
Figure 2:
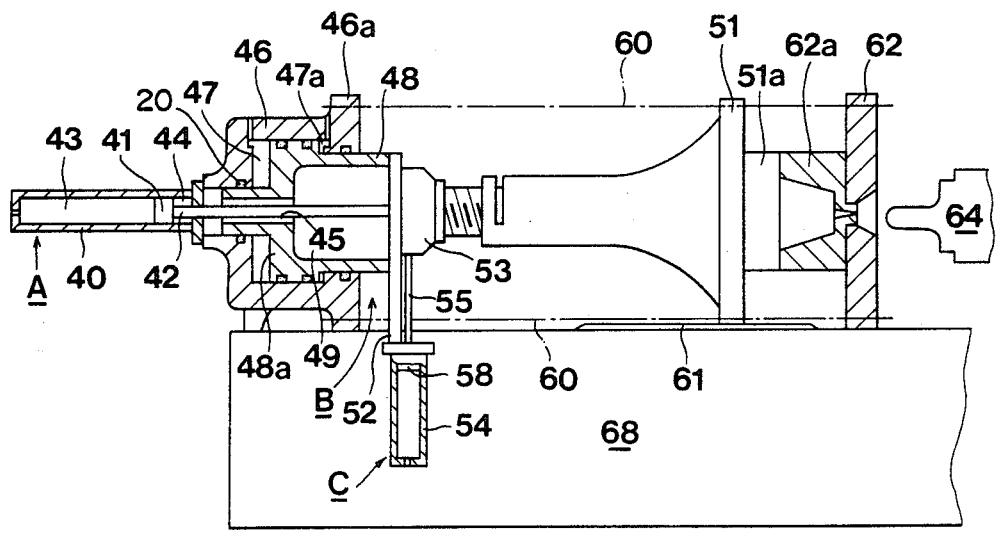
FIG. 2 is a schematic side sectional view showing the hydraulic clamping device of FIG. 1 in enlarged scale.

Referring first to FIGS. 1 and 2, an injection molding machine is constructed such that a mixer 66 arranged above a base bed 68 mixes synthetic resin material supplied from a hopper 65 mounted above the mixer 66 which is driven by a prime mover 67. After being mixed the resin material is fed to a heater 64. The material is then injected from a nozzle at the tip of the heater 64 into an inner cavity between a fixed mold 62a returned by a first support 62 and a movable mold 51a retained by a second mold support member 51.

The mold support member 62 is secured to the base 68 whereas the mold support member 51 is slidably guided thereon by a guide rail 61. Four upper and lower tie rods 60 are connected between an end flange 46a of a large diameter cylinder 46 secured to the base 68 and the mold support member 62 and extend through the mold support member 51 so as to guide its movement along a path moving the mold 51a toward the mold 62a.

The base 68 houses an oil pressure generating unit that supplies pressure oil to hydraulic actuator devices as will be described hereinafter. Such an oil pressure generating unit is substantially similar to that of the prior art and, therefore, a description thereof will be omitted.

As shown in FIG. 1, the hydraulic clamping device in accordance with the present invention comprises a first quick feed hydraulic actuator A, a second clamping hydraulic actuator B and a clutch mechanism C. In the second clamping actuator device B, a large diameter portion of a cup-shaped hollow piston 48a and a hollow ram 48 integral therewith are mounted for reciprocating movement in a large diameter portion of a cylinder 46 secured to the base 68 of the injection molding machine. Defined by the cylinder 46 and the ram piston 48a are oil chambers 47 and 47a to which are supplied pressure oil from the oil pressure generating unit in the base 68.

The quick feed actuator device A is provided with a first piston 41 mounted for reciprocating movement in a first cylinder 40 secured to an external end wall of the second cylinder 46. Defined by the cylinder 40 and the piston 41 are an oil chamber 43 and an oil chamber 44. A rod 42, one end of which is connected to the piston 41, passes through an end wall of the first cylinder 40, an axially aligned central opening 45 in the piston 48a and a hollow portion 49 therein and an opposite end thereof is attached to an engagement portion 42a (FIG. 3) of the mold support member 51. Receiving the engagement portion 42a of the member 51 is the hollow portion 49 of the ram piston 48a when the rod 42 is in a retracted position separating the molds 51a and 62a.

Included in the clutch mechanism C is a vertical guide rail 52 secured to on the open end wall of the hollow ram 48. Mounted at the lower end of the guide rail is a clutch driving cylinder 54. A bifurcated clutch plate 53 is supported on an end of a clutch rod 55 connected to a piston 58 in the cylinder 54 and can move up and down along the guide rail 52.

Figure 3:
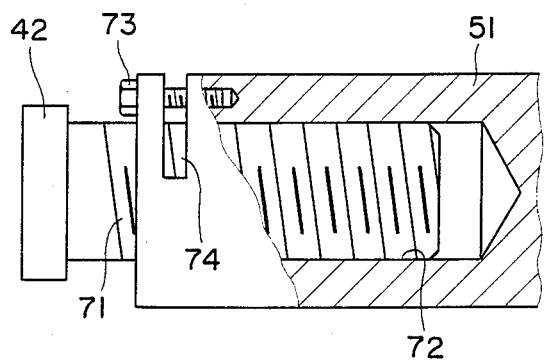
FIG. 3 is a schematic side sectional view of a coupling between a mold support member and a piston rod in the device of FIGS. 1 and 2.
Figure 4:
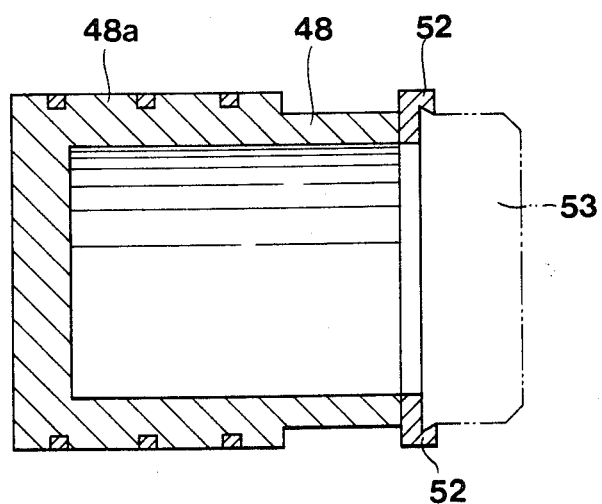
FIG. 4 is a schematic perspective view of a hydraulic clamping device in accordance with a second embodiment of the present invention.
Figure 5:
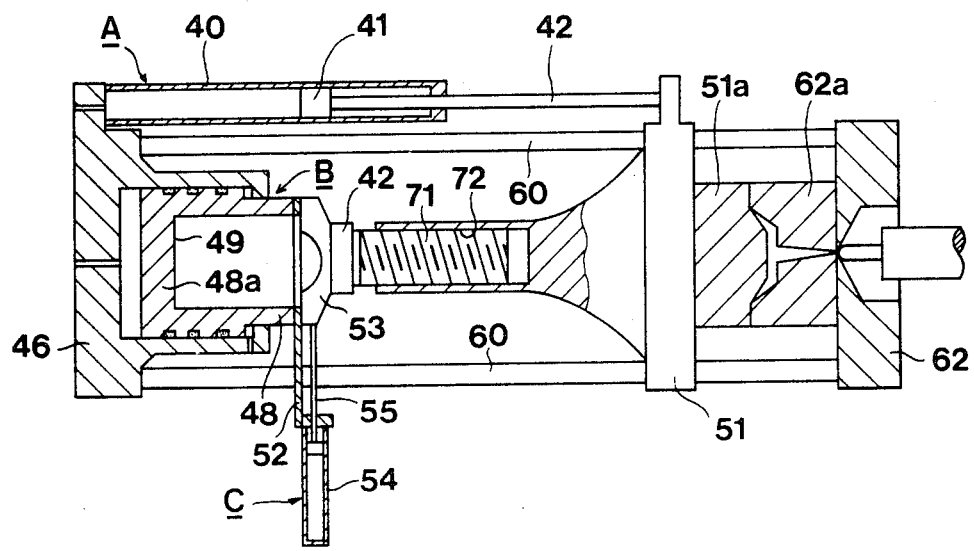
FIG. 5 is a schematic side sectional view of a device shown in FIG. 4.

As shown in FIG. 3, a threaded adjustment shaft 71 joins the engagement portion 42a to a threaded hole 72 in the mold support member 51. A slot 74 in the threaded hole 72 is formed in the mold support member 51. To eliminate play or looseness in a particular adjusted position of the shaft 71 in the hole 72, a bolt 73 extending parallel to the threaded shaft 71 and across the slot 74 can be tightened. Thereby, it is possible to vary the spacing between the engagement portion 42a and the mold 51a. Consequently the stroke range between the movable mold 51a and the fixed mold 62a can be adjusted to accommodate molds of different size.

Next, operation of the present invention will be described. In the state shown in FIG. 1, the movable mold 51a has been moved away from the fixed mold 62a to permit removal of a molded article. To again move the mold 51a rapidly into contact with the fixed mold 62a, the oil chambers 43 and 44 of the quick feed cylinder 40 are connected, respectively, to the oil pressure source and the oil reservoir in the base 68. Pressure in the chamber 43 produces a stroke of the piston 41 rightwardly and the mold support member 51 and movable mold 51a are rapidly moved against the fixed mold 62a by the rod 42. During this stroke of the rod 42, the ram piston 48 is disengaged from the support 51 and does not move. Consequently, the engagement portion 42 (FIG. 3) of the mold support member 51 moves out of the hollow portion 49 of the ram 48.

The oil chamber behind the piston 58 of the cylinder 54 then is connected to the oil pressure source. Resultant pressure forces the piston 58 and rod 55 upwardly and the bifurcated clutch plate 53 is moved into an engaged position between the right end surface of the ram 48 and the left end surface of the mold support member 51 as shown in FIG. 2. Thus, when oil pressure is exerted in the chamber 47, the piston 48a and the ram 48 undergo a rightward stroke and the mold support member 51 is pressed rightwardly through the clutch plate 53. That is, the movable mold 51a is firmly pressed against the fixed mold 62a when oil chambers 43, 44 of the quick feed cylinder 40 are connected to the oil reservoir and the oil chamber 47 of the large diameter cylinder 46 is connected to the oil pressure source. The produced between the movable mold 51a and the fixed mold 62a is determined by the oil pressure in the oil chamber 47 that is applied to the face of the large diameter piston 48a. It will be noted that the high pressure seals 20 and 30 are subjected only to movement of the piston 48a, the stroke of which is substantially shorter than that of the rod 42.

In accordance with the present invention, the ram 48 is separated from the quick feed piston 41. Therefore, the mold support member 51 of the movable mold 51a is quickly fed by the rod 42 independently of the ram 48 and thereafter the mold support member 51 and the ram 48 are engaged by the clutch plate 53 to transmit a powerful clamping force to the movable mold 51a. Since the ram 48 does not move during the quick feed stroke the powerful clamping stroke of the piston 48a is obtained by the supply of a relatively small volume of pressure oil to the cylinder 46. Accordingly, the present device is power efficient, the mold support member 51 can be rapidly started and stopped, and a rapid rise in clamping force is obtained. Furthermore, the entire clamping force is generated hydraulically without any mechanical force generating structure. Lubrication, therefore, is not required and the device is simple experiencing less trouble and providing prolonged service life.

Of further note and as described above the clamping cylinder device B and the quick feed cylinder device A are arranged on the same center axis thereby simplifying construction of the device. Since the operating stroke of the ram 48 of the clamping cylinder device B is short, machining is readily accomplished to provide accurate parallelism with respect to the stroke of the mold. Thus, even if the same or different molds are repeatedly opened and closed during use of the apparatus, the parallelism between or precision of both molds can be accurately maintained without fear of change.

While in the above-described embodiment, the clutch plate 53 interposed between the end surface of the ram 48 and the mold support member 51 is moved vertically, it should be noted that the clutch plate 53 also could be moved either horizontally or rotated about a shaft in such a way that it moves retractably between the ram 48 and the mold support device 51.

Figure 6:
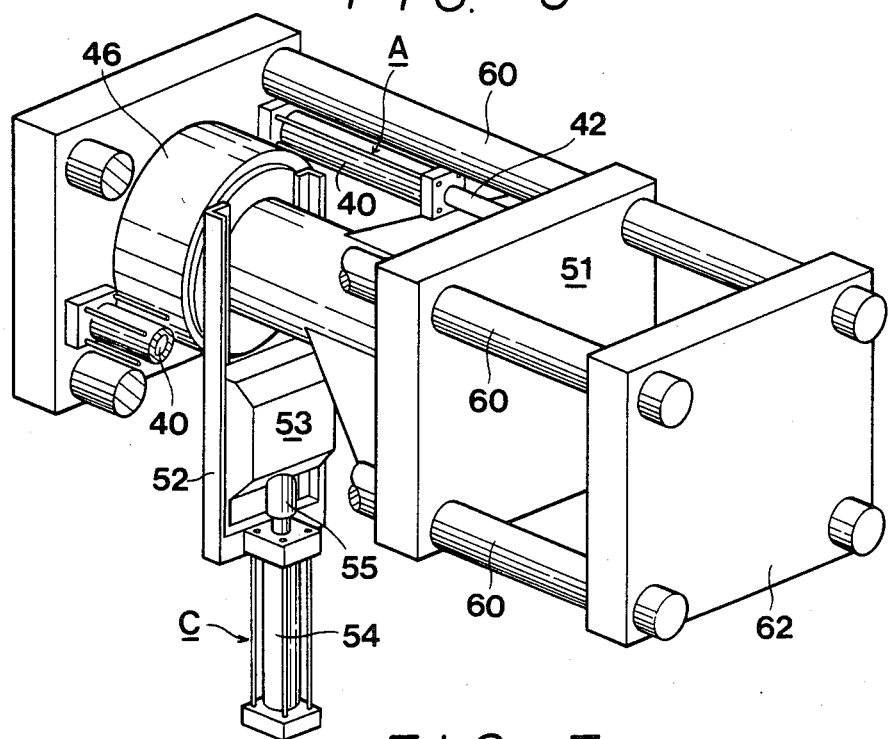
FIG. 6 is a schematic side sectional view of a ram piston of the device shown in FIGS. 4 and 5.
Figure 7:
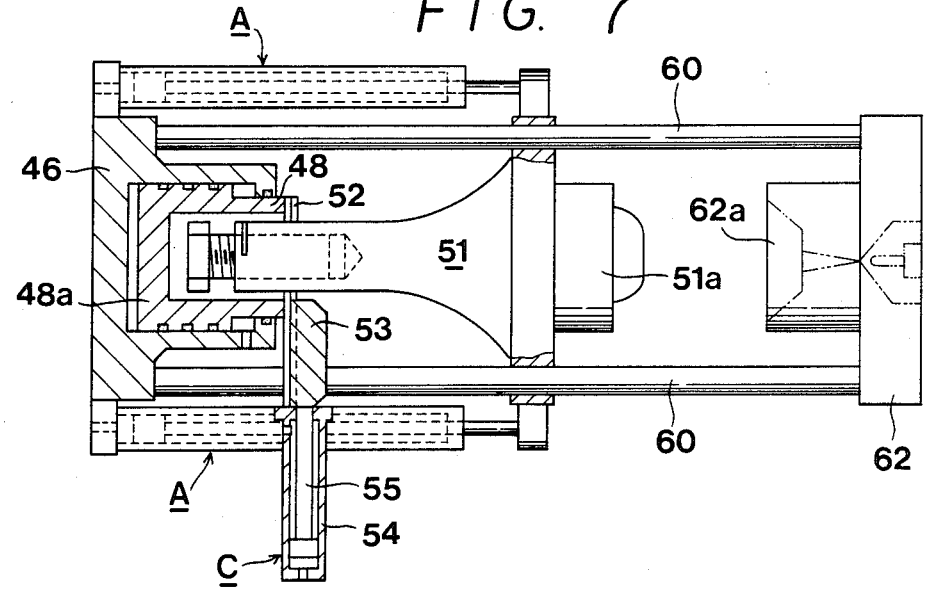
FIG. 7 is a schematic side sectional view showing the clamping state of the device shown in FIGS. 4 and 5.
Figure 8:
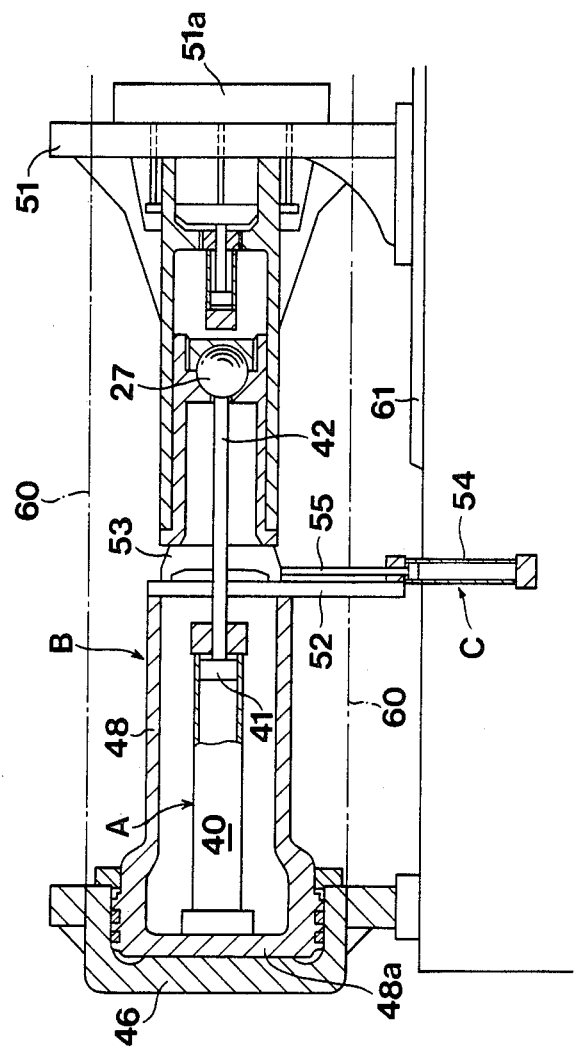
FIG. 8 is a schematic side sectional view of a clamping device in accordance with a third embodiment of the present invention.

In the embodiments shown in FIGS. 4 to 7, a plurality of quick feed cylinder devices A are displaced transversely to and in parallel with the clamping cylinder device B. In this case, the clutch plate 53 need not be bifurcated and as shown plate 53a of a rectangular shape can be employed. Again, the guide rail 52 for retractably guiding the clutch plate 53a between the ram 48 and the mold support member 51 is secured to and supported on the end of the ram 48, as shown in FIG. 6. Other structure of this embodiment is similar to that shown in FIGS. 1 to 3, and like members are indicated by the same reference numerals. Again in this embodiment, the operating stroke of the ram 48 is small and, therefore, the length of the entire clamping device (the dimension in an axial direction of the ram 48) is relatively short.

In the embodiment shown in FIG. 10, a quick feed cylinder device A' is arranged in a hollow portion defined by a piston 48a' and a ram 48'. That is, the end of a cylinder 40' of the quick feed cylinder device A' is secured to an inner end wall of the piston 48a', and one end of a rod 42' is joined to a piston 41' fitted into the cylinder 40'. The opposite end of the rod 42' is connected to a hollow portion of the mold support member 51' by a ball joint 27. A guide rail 52 again is secured to an end wall of the ram 48', and a clutch plate 53 driven by a driving cylinder device C is supported on the guide rail 52. Other structure is similar to that shown in FIGS. 1 to 3 and like members are indicated by the same reference numerals.

Again, in this embodiment, the operating stroke of the piston 48a' is small, and in the state wherein the movable mold 51a is retracted from the fixed mold, the clutch plate 53 is withdrawn downwardly, and left engagement portion of the mold support member 51' is disposed within a hollow portion of the ram 48'. The rotatable ball joint 27 prevents the exertion of excessive force on the connection if concentricity between the rod 42' of the quick feed cylinder device A and the mold support member 51' deviates. Thus, smooth movement of the mold support member 51' is facilitated.

We claim:

1. Hydraulic clamping apparatus for an injection molding machine comprising:
   base means;
   a first support means for supporting a first mold and retained by said base means;
   a second support means for supporting a second mold and retained by said base means, said second support means being movable relative to said base means along a path so as to move said second mold into engagement with said first mold;
   a first hydraulic actuator comprising a first cylinder, a first piston retained thereby, and a rod coupled between said first piston and said second support means; said first actuator operable to produce reciprocating first strokes of said rod along said path;
   a second hydraulic actuator comprising a second cylinder and a ram piston shaped and arranged so as to permit with respect thereto relative movement along said path of said second support means; said ram piston having a diameter substantially greater than said first piston and movable along said path in reciprocating second strokes substantially shorter than said first strokes; said second cylinder comprising large and small diameter portions retaining respectively a large diameter portion of said ram piston and a small diameter portion thereof, said ram piston defining an opening that is axially aligned with and receives said rod which is connected to an engagement portion of said second support means, and said second actuator further comprising a first annular seal between said large diameter portions of said second cylinder and said ram piston and a second annular seal between said small diameter portions thereof; and
   a clutch means operable to engage said second piston with said engagement portion of said second support means so as to produce movement thereof in response to said second strokes.

2. An apparatus according to claim 1 including adjustment means for adjusting the spacing along said path between said engagement portion of said second support means and said second mold.

3. An apparatus according to claim 2 wherein said adjustment means comprises a threaded coupling between said second support means and said engagement portion thereof.

4. An apparatus according to claim 1 wherein said ram piston defines an internal cavity that receives said engagement portion of said second support means after completion of said first stroke in a direction separating said first and second molds.

5. An apparatus according to claim 4 including adjustment means for adjusting the spacing along said path between said engagement portion of said second support means and said second mold.

6. An apparatus according to claim 5 wherein said adjustment means comprises a threaded coupling between said second support means and said engagement portion thereof.

7. An apparatus according to claim 6 wherein said clutch means is retained by said ram piston.

8. An apparatus according to claim 1 wherein said clutch means is retained by said ram piston.

9. An apparatus according to claim 8 including adjustment means for adjusting the spacing along said path between said engagement portion of said second support means and said second mold.

10. An apparatus according to claim 9 wherein said adjustment means comprises a threaded coupling between said second support means and said engagement portion thereof.

11. Hydraulic clamping apparatus for an injection molding machine comprising:
  base means;
  a first support means for supporting a first mold and retained by said base means;
  a second support means for supporting a second mold and retained by said base means, said second support means including an engagement portion and being movable relative to said base means along a path so as to move said second mold into engagement with said first mold;
  a first hydraulic actuator comprising a first cylinder, a first piston retained thereby, and a rod coupled between said first piston and said second support means; said first actuator operable to produce reciprocating first strokes of said rod along said path;
  a second hydraulic actuator comprising a second cylinder and a ram piston shaped and arranged so as to permit with respect thereto relative movement along said path of said second support means, said ram piston having a diameter substantially greater than said first piston and movable along said path in reciprocating second strokes substantially shorter than said first strokes, said ram piston defining an internal cavity that receives said engagement portion after completion of said first stroke in a direction that separates said first and second molds; and
  a clutch means operable to engage said second piston with said engagement portion of said second support means so as to produce movement thereof in response to said second strokes.

12. An apparatus according to claim 11 including adjustment means for adjusting the spacing along said path between said engagement portion of said second support means and said second mold.

13. An apparatus according to claim 12 wherein said adjustment means comprises a threaded coupling between said second support means and said engagement portion thereof.

14. An apparatus according to claim 11 wherein said clutch means is retained by said ram piston.

15. Hydraulic clamping apparatus for an injection molding machine comprising:
  base means;
  a first support means for supporting a first mold and retained by said base means;
  a second support means for supporting a second mold and retained by said base means, said second support means being movable relative to said base means along a path so as to move said second mold into engagement with said first mold;
  a first hydraulic actuator comprising a first cylinder, a first piston retained thereby, and a rod coupled between said first piston and said second support means; said first actuator operable to produce reciprocating first strokes of said rod along said path;
  a second hydraulic actuator comprising a second cylinder and a ram piston shaped and arranged so as to permit with respect thereto relative movement along said path of said second support means, said ram piston having a diameter substantially greater than said first piston and movable along said path in reciprocating second strokes substantially shorter than said first strokes; and
  a clutch means operable to engage said ram piston with an engagement portion of said second support means so as to produce movement thereof in response to said second strokes, said clutch means being retained by said ram piston.

16. An apparatus according to claim 15 wherein said ram piston defines an internal cavity that receives said engagement portion of said second support means after completion of said first stroke in a direction separating said first and second molds.

17. Hydraulic clamping apparatus for an injection molding machine comprising:
  base means;
  a first support means for supporting a first mold and retained by said base means;
  a second support means for supporting a second mold and retained by said base means, said second support means being movable relative to said base means along a path so as to move said second mold into engagement with said first mold;
  a first hydraulic actuator comprising a first cylinder, a first piston retained thereby, and a rod coupled between said first piston and said second support means; said first actuator operable to produce reciprocating first strokes of said rod along said path;
  a second hydraulic actuator comprising a second cylinder and a ram piston shaped and arranged so as to permit with respect thereto relative movement along said path of said second support means, said ram piston having a diameter substantially greater than said first piston and movable along said path in reciprocating second strokes substantially shorter than said first strokes;
  a clutch means operable to engage said ram piston with an engagement portion of said second support means so as to produce movement thereof in response to said second strokes; and
  adjustment means for adjusting the spacing along said path between said engagement portion of said second support means and said second mold.

18. An apparatus according to claim 17 wherein said ram piston defines an internal cavity that receives said engagement portion of said second support means after completion of said first stroke in a direction separating said first and second molds.

19. Hydraulic clamping apparatus for an injection molding machine comprising:
  base means;
  a first support means for supporting a first mold and retained by said base means;
  a second support means for supporting a second mold and retained by said base means, said second support means being movable relative to said base means along a path so as to move said second mold into engagement with said first mold;

a first hydraulic actuator comprising a plurality of first cylinders, a plurality of first pistons each retained by one of said first cylinders, and a plurality of rods each coupled between one of said first pistons and said second support means; said first actuator operable to produce reciprocating first strokes of said rods along said path;

a second hydraulic actuator comprising a second cylinder and a ram piston shaped and arranged so as to permit with respect thereto relative movement along said path of said second support means, said ram piston having a diameter substantially greater than said first piston and movable along said path in reciprocating second strokes substantially shorter than said first strokes, the axis of said second strokes being parallel to and transversely displaced from the axes of first strokes; and a clutch means operable to engage said second piston with an engagement portion of said second support means so as to produce movement thereof in response to said second strokes.

20. An apparatus according to claim 19 including adjustment means for adjusting the spacing along said path between said engagement portion of said second support means and said second mold.

21. An apparatus according to claim 19 wherein said clutch means comprises guide means retaind by said ram piston, a clutch plate retained by said guide means and movable into position engaged between said second piston and said engagement portion of said second support means, and hydraulic means for producing said movement of said clutch plate.

22. An apparatus according to claim 11 wherein said rod is coupled to said second support means by a rotatable coupling.

* * * * *